US012442583B2

(12) United States Patent
Dhuley

(10) Patent No.: US 12,442,583 B2
(45) Date of Patent: Oct. 14, 2025

(54) BOLTED JOINT CONDUCTION COOLING APPARATUS FOR ACCELERATOR CAVITIES

(71) Applicant: FERMI RESEARCH ALLIANCE, LLC, Batavia, IL (US)

(72) Inventor: Ram Dhuley, Aurora, IL (US)

(73) Assignee: Fermi Forward Discovery Group, LLC, Chicago, IL (US)

( * ) Notice: Subject to any disclaimer, the term of this patent is extended or adjusted under 35 U.S.C. 154(b) by 1200 days.

(21) Appl. No.: 17/306,481

(22) Filed: May 3, 2021

(65) Prior Publication Data

US 2021/0356193 A1 Nov. 18, 2021

Related U.S. Application Data

(60) Provisional application No. 63/023,811, filed on May 12, 2020.

(51) Int. Cl.
*F25D 19/00* (2006.01)
*H05H 7/02* (2006.01)
*H05H 7/20* (2006.01)

(52) U.S. Cl.
CPC ............ *F25D 19/006* (2013.01); *H05H 7/02* (2013.01); *H05H 7/20* (2013.01); *H05H 2007/025* (2013.01)

(58) Field of Classification Search
None
See application file for complete search history.

(56) References Cited

U.S. PATENT DOCUMENTS 4,577,325 A * 3/1986 Mertin ................. H05B 7/105
373/101
5,497,050 A 3/1996 Cheo
(Continued)

FOREIGN PATENT DOCUMENTS

GB 2490325 A * 10/2012 ............. A61B 5/055
WO 2013090342 A1 6/2013
WO 2016043783 A1 3/2016

OTHER PUBLICATIONS

R. Kephart et al., "SRF, compact accelerators for industry & society," in Proc. 17th Int. Conf. RF Supercond., Whistler, 2015, pp. 1467-1473.
(Continued)

*Primary Examiner* — Srinivas Sathiraju
(74) *Attorney, Agent, or Firm* — LOZA & LOZA, LLP; Kevin L. Soules

(57) ABSTRACT

Methods and systems for bolted joint conduction cooling of accelerator cavities comprises a conduction cooling system. The conduction cooling system comprises mounting at least one cooling ring to a cavity and a conduction link joined to the cooling ring with at least one connection assembly. The materials in the at least one connection assembly can be selected to experience greater thermal contraction than the cooling ring and the conduction link when cooled. A fast conduction cooling system can comprise a cryocooler in thermal communication with a conduction cooling apparatus affixed to a cavity via a conduction path and a thermal switch in the conduction path between the cryocooler and the conduction cooling apparatus wherein a thermal conductance of the thermal switch decreases as a function of temperature.

20 Claims, 15 Drawing Sheets

(56) References Cited

U.S. PATENT DOCUMENTS

| | | | |
|---|---|---|---|
| 5,504,341 | A | 4/1996 | Glavish |
| 6,025,681 | A | 2/2000 | Yu et al. |
| 6,172,463 | B1 | 1/2001 | Cutler et al. |
| 6,281,622 | B1 | 8/2001 | Valentian et al. |
| 6,348,757 | B1 | 2/2002 | Marini |
| 7,140,771 | B2 | 11/2006 | Leek |
| 7,239,095 | B2 | 7/2007 | Ho et al. |
| 8,159,158 | B2 | 4/2012 | Popovic et al. |
| 8,378,322 | B2 * | 2/2013 | Dahm ................. F21K 9/20 362/218 |
| 8,593,146 | B2 | 11/2013 | Gao et al. |
| 8,674,630 | B1 | 3/2014 | Cornelius |
| 8,779,697 | B2 | 7/2014 | Baurichter et al. |
| 9,398,681 | B2 | 7/2016 | Tantawi et al. |
| 9,642,239 | B2 * | 5/2017 | Kephart ................. H05H 7/22 |
| 9,669,237 | B2 * | 6/2017 | Calvert ............... A61N 5/1082 |
| 10,070,509 | B2 * | 9/2018 | Kephart ................. H05H 7/22 |
| 10,390,419 | B2 * | 8/2019 | Kephart ................. H05H 7/20 |
| 10,645,793 | B2 * | 5/2020 | Hassan ................. H05H 7/20 |
| 10,932,355 | B2 * | 2/2021 | Ciovati ................. H05H 9/048 |
| 10,993,310 | B2 * | 4/2021 | Kephart ................. H05H 7/22 |
| 11,465,920 | B2 * | 10/2022 | Geelhoed ............... C02F 1/441 |
| 11,639,010 | B2 * | 5/2023 | Geelhoed ............. A01M 1/226 162/50 |
| 2004/0085096 | A1 | 5/2004 | Ward et al. |
| 2008/0068112 | A1 | 3/2008 | Yu et al. |
| 2012/0326636 | A1 | 12/2012 | Eaton et al. |
| 2013/0328506 | A1 | 12/2013 | Yamamoto et al. |
| 2016/0035531 | A1 | 2/2016 | Lunin et al. |
| 2016/0263400 | A1 * | 9/2016 | Calvert ............... G01R 33/3815 |
| 2016/0309573 | A1 * | 10/2016 | Kephart ................. H05H 7/20 |
| 2017/0094770 | A1 * | 3/2017 | Kephart ................. H05H 7/22 |
| 2017/0120074 | A1 * | 5/2017 | Calvert ................. A61B 5/055 |
| 2018/0352644 | A1 * | 12/2018 | Kephart ................. H05H 7/22 |
| 2019/0224751 | A1 * | 7/2019 | Thangaraj ............. H01J 37/305 |
| 2020/0015347 | A1 * | 1/2020 | Kephart ................. H05H 7/22 |
| 2020/0139620 | A1 * | 5/2020 | Sauers ................. H01J 37/06 |
| 2020/0275676 | A1 * | 9/2020 | Rabault ................. A21D 13/068 |
| 2021/0008756 | A1 * | 1/2021 | Geelhoed ............... A01M 1/226 |
| 2021/0009443 | A1 * | 1/2021 | Geelhoed ................. C02F 1/305 |
| 2021/0356193 | A1 * | 11/2021 | Dhuley ................. H05H 7/02 |
| 2022/0396504 | A1 * | 12/2022 | Geelhoed ................. H05H 7/20 |

OTHER PUBLICATIONS

J. P. Holzbauer and A. Nassiri, "Thermal study of a cryogen-less MgB2 cavity," Nucl. Instrum. Methods Phys. Res., Sect. A, vol. 767, pp. 407-414, Dec. 2014.

A. Nassiri et al., "Cryogen-free RF system studies using cryocooler-cooled magnesium diboride-coated copper RF cavities," in Proc. SRF, Paris, 2013, pp. 663-665.

G. Ciovati et al., "Design of a cw, low energy, high power superconducting linac for environmental applications," Phys. Rev. Accel. Beams, vol. 21, No. 9, 2018, Art. No. 091601.

Ciovati, G., Cheng, G., Daly, E., Eremeev, G. V., Henry, J., Rimmer, R. A., Parajuli, I. P., and Pudasaini, U. "A multi-layered SRF cavity for conduction cooling applications." 19th Int. Conf. on RF Superconductivity, 538-542, 2019.

* cited by examiner

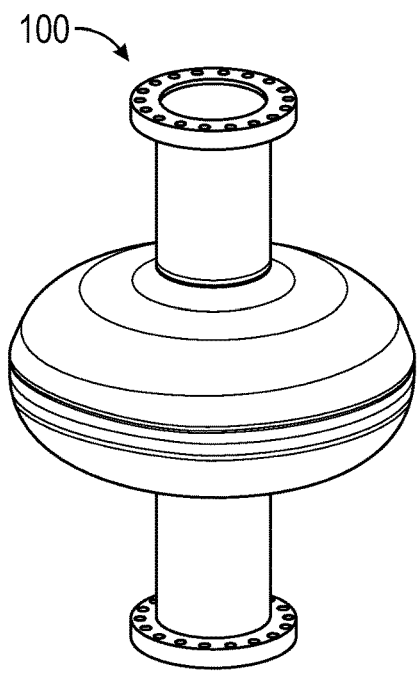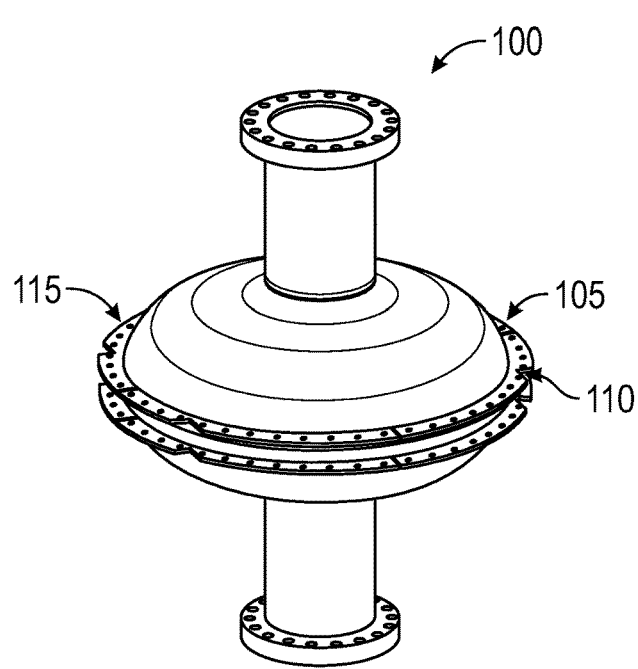
FIG. 1A  FIG. 1B
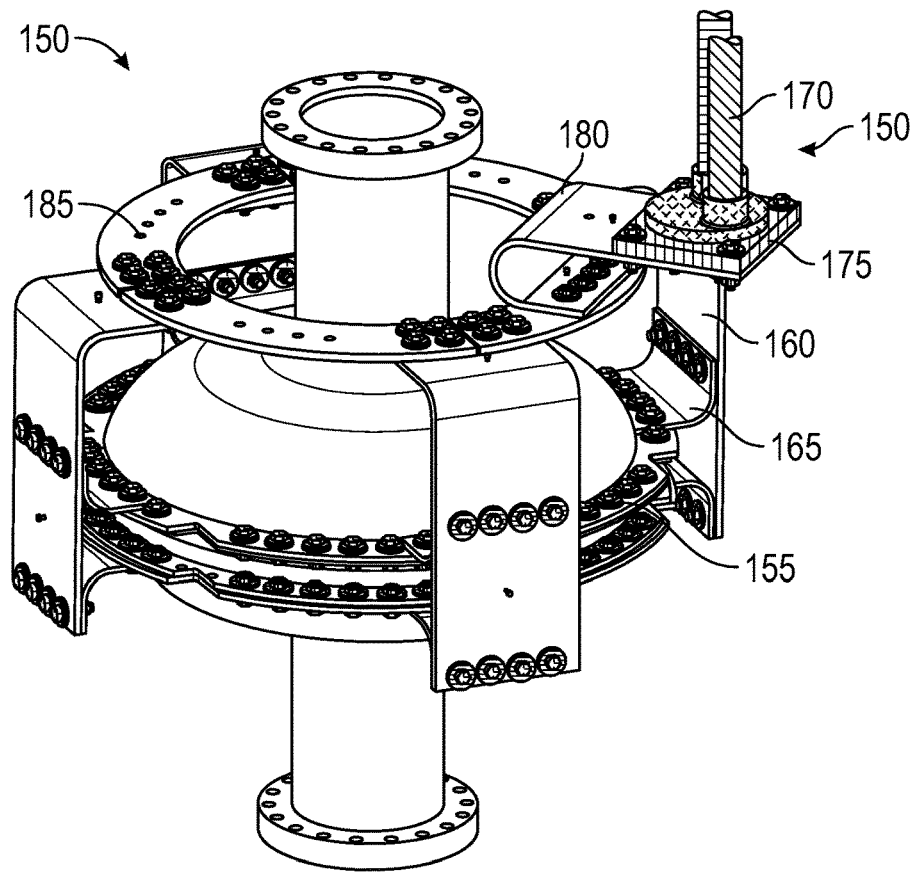
FIG. 1C

BOLTED JOINT CONDUCTION COOLING APPARATUS FOR ACCELERATOR CAVITIES

CROSS REFERENCE TO RELATED PATENT APPLICATIONS

This patent application claims the priority and benefit under 35 U.S.C. § 119(e) of U.S. Provisional Patent Application Ser. No. 63/023,811, filed May 12, 2020, entitled "BOLTED JOINT CONDUCTION COOLING APPARATUS FOR ACCELERATOR CAVITIES." U.S. Provisional Patent Application Ser. No. 63/023,811 is herein incorporated by reference in its entirety.

STATEMENT OF GOVERNMENT RIGHTS

The invention described in this patent application was made with Government support under the Fermi Research Alliance, LLC, Contract Number DE-AC02-07CH11359, awarded by the U.S. Department of Energy. The Government has certain rights in the invention.

TECHNICAL FIELD

Embodiments are generally related to superconductors. Embodiments are further related to accelerator cavities. Embodiments are additionally related to methods and systems for cooling accelerator cavities. Embodiments are further related to methods and systems for conduction cooling of accelerator cavities. Embodiments are further related to methods and systems for assembling bolted joint conduction cooling apparatuses for accelerator cavities.

BACKGROUND

Previous conduction cooling methods required couplings to large cooling systems using aluminum links. Aluminum has a thermal conductivity of approximately $1\times10^4$ W/(m*K) at temperatures of approximately 4 Kelvin. The high purity thermal link is bolted to niobium cooling rings around the cavity using bolts made of brass or bronze.

Of the three materials commonly used (aluminum, niobium, and the bolt material brass or bronze), niobium shrinks the least when cooled from room temperature to 4 Kelvin. Aluminum shrinks more than the bolt material (whether brass or bronze), which causes the bolted joint to loosen. The resulting loss of mechanical pressure at a loosened bolted joint will increase thermal contact resistance across the joint.

To solve this problem, prior art approaches include the use of pressure retention devices such as disc springs. However, disc springs (commonly made of steel) may introduce magnetic fields around the superconducting cavity, causing significant performance degradation. In addition, aluminum is known to form a hard, difficult-to-remove surface oxide layer which requires chemical cleaning in a sodium hydroxide solution, which can lead to high thermal contact resistance across aluminum-niobium bolted joints.

Furthermore, due to thermal contact resistance, typical conduction cooled devices, require multiple days to cool down to the desired temperature. For example, the IARC test SRF cavity at FermiLab takes 2-2.5 days to cooldown. In the field, the cooldown time will reduce the availability of an accelerator, so faster cooldown times are desirable.

Accordingly, there is a need in the art for systems and methods that improve the thermal contact between a conduction cooling apparatus and particle accelerator.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for accelerator cavity cooling.

It is another aspect of the disclosed embodiments to provide a method and system for conduction cooling accelerator cavities.

It is another aspect of the disclosed embodiments to provide methods, systems, and apparatuses for producing cooling systems for accelerator cavities.

The aforementioned aspects and other objectives and advantages can now be achieved as described herein. The embodiments disclosed herein comprise a method for assembling a conduction cooling system comprises mounting at least one cooling ring to a cavity, configuring a conduction link to be joined to the cooling ring with at least one connection assembly, and selecting the materials in the at least one connection assembly to experience greater thermal contraction than the cooling ring and the conduction link when cooled. The method can comprise selecting the cooling ring to be made of niobium, selecting the conduction link to be made of copper, and selecting the connection assembly to be made of at least one of: brass, bronze, and/or Be—Cu (beryllium copper). In an embodiment, the method further comprises connecting at least one cooling ring to a flexible strap and making thermal contact between a bus bar and the flexible strap. The method can further comprise pumping cooled fluid through the bus bar.

In an embodiment, a conduction cooling system comprises at least one cooling ring connected to a flexible strap, a bus bar in thermal contact with the flexible strap, and a fluidic system configured to pump cooled fluid through the bus bar. In an embodiment, the fluidic system further comprises a conduit for transporting gas, a cryogenic circulator for driving the gas through the conduit, and a heat exchanger for cooling the gas flowing through the heat exchanger. In an embodiment, the system comprises at least one ring mount with at least one hole pattern that match a hole pattern on the at least one cooling ring. In an embodiment the system further comprises a cold head connected to the bus bar. The conduction cooling system further comprises a cryocooler stage and a conduction mounting bracket connecting the cold head and the bus bar.

In an embodiment, a fast conduction cooling system comprises a cryocooler in thermal communication with a conduction cooling apparatus affixed to a cavity via a conduction path and a thermal switch in the conduction path between the cryocooler and the conduction cooling apparatus wherein a thermal conductance of the thermal switch decreases as a function of temperature. In an embodiment, the thermal switch comprises a gas filled body with at least one fin formed therein. In an embodiment, the thermal switch comprises a gas filled body with at least one thermal absorption bed therein. In an embodiment the thermal switch comprises a gas filled body, a vacuum pump, and at least one valve wherein the valve can be opened to pump the gas out of the body. In an embodiment, the thermal switch comprises a thermal contact plate configured to mechanically engage and disengage the conduction path. In an embodiment, of the fast conduction cooling system the conduction path is made of copper. In an embodiment of the fast conduction cooling system the cryocooler comprises a first stage and a second stage. In an embodiment, the thermal switch is configured between the first stage and the second stage of the cryocooler. In an embodiment, the first stage is configured to provide cooling power at temperatures greater than 30 K, and the second stage is configured to provide cooling power at temperatures greater than 3K.

Various additional embodiments and descriptions are provided herein.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 1A depicts a single cell elliptical cavity, in accordance with the disclosed embodiments;

FIG. 1B depicts a single cell elliptical cavity with conduction cooling rings, in accordance with the disclosed embodiments;

FIG. 1C depicts a conduction link and thermal conduction cooling arrangement on a single cell elliptical cavity, in accordance with the disclosed embodiments;

DETAILED DESCRIPTION

Figure 2:
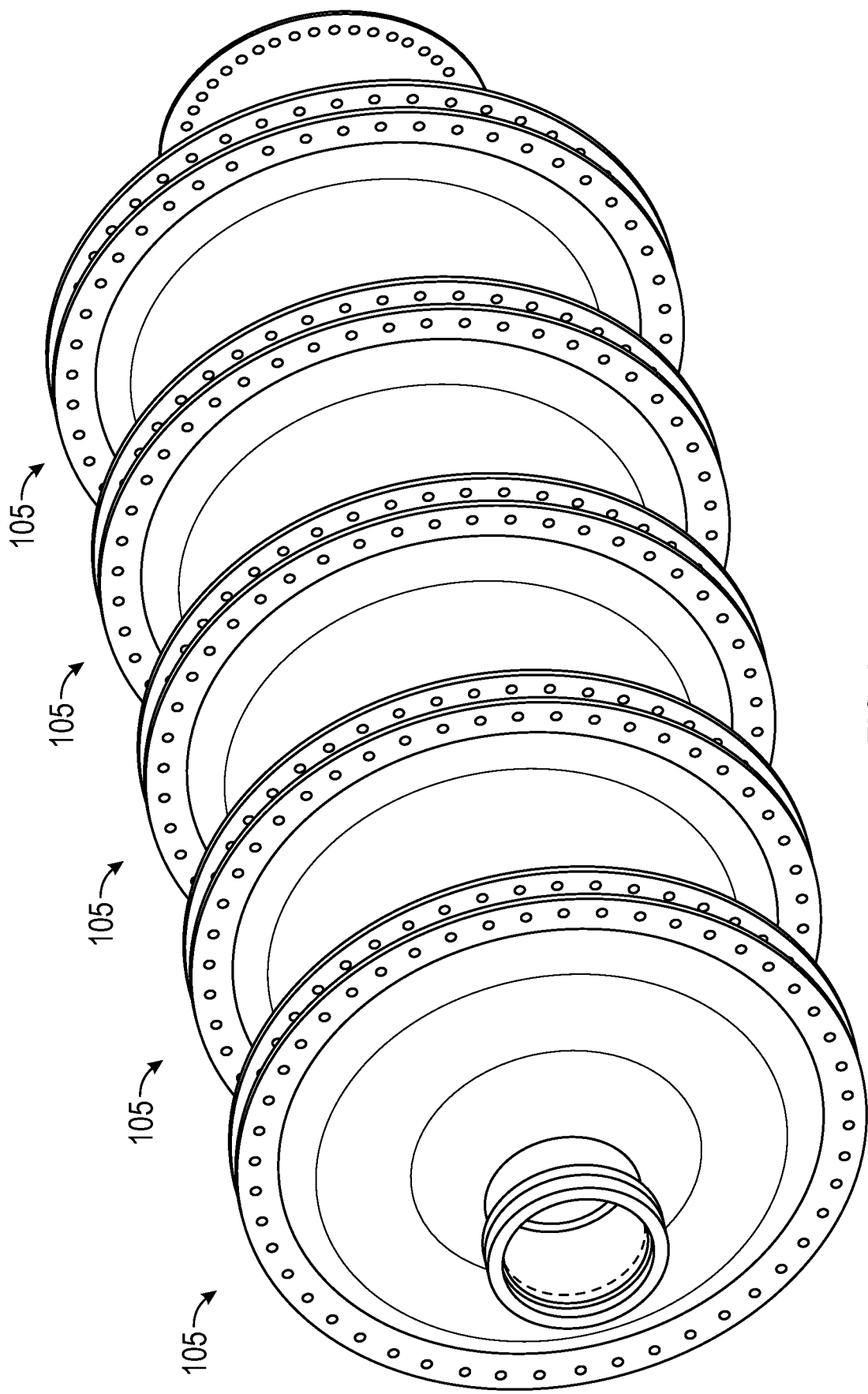
FIG. 2 depicts a multicell elliptical cavity, in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or" as used herein may include a variety of meanings that may depend at least in part upon the context in which such terms are used. Typically, "or" is used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. In addition, the term "based on" may be understood as not necessarily intended to convey an exclusive set of factors and may, instead, allow for existence of additional factors not necessarily expressly described, again, depending at least in part on context.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments disclosed herein provide a system and apparatus designed to improve the thermal conduction of conduction cooling systems associated with accelerator cavities. Various systems for conduction cooling exist. One such conduction cooling system is described in U.S. Pat. No. 10,070,509. Another such system is described in U.S. Pat. No. 9,642,239. These exemplary systems describe basic components that can be associated with a conduction cooling system.

Conduction cooling an SRF cavity by directly connecting to a closed-cycle cryocooler with a thermally conductive link can eliminate the need for the conventional helium bath. This elimination leads to dramatic simplification of the accelerator. In addition to reducing the burden of classic cryogenic inventory, the cryogenics becomes very reliable (commercial 4 K cryocoolers have mean time between maintenance of >20 000 hours-2.3 years), are safe (no liquid helium safety and oxygen deficiency hazards), and are simple to operate (cryocoolers turn on/off with push of a button).

Figure 12:
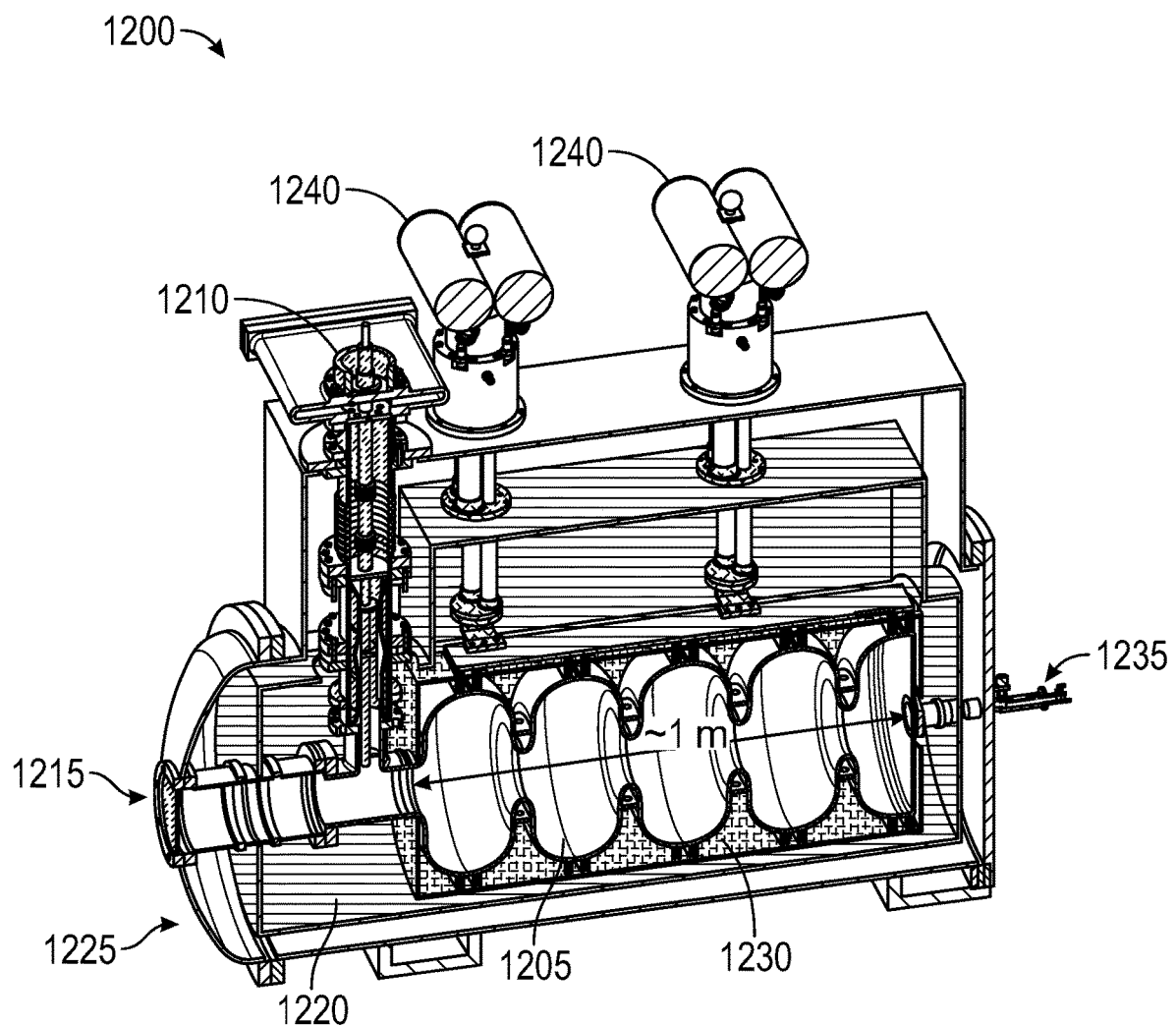
FIG. 12 depicts elliptical multi-cell niobium cavity, in accordance with the disclosed embodiments.

FIG. 12, illustrates an exemplary elliptical multi-cell niobium cavity 1200. The parameters associated with this embodiment are exemplary. It should be appreciated that other cavities with other parameters are also included in the embodiments disclosed herein. The system illustrated in FIG. 12 includes a cavity 1205 with a resonance frequency of 650 MHz, accelerating length, Lacc of approximately 1 m, shape factor, G of approximately 265Ω, and normalized shunt impedance, r/Q of approximately 750Ω. For conduction cooling, niobium rings (SRF grade, RRR>300) can be e-beam welded to the two elliptical half-cells as illustrated in FIG. 1.

The cavity 1205 can include an input power coupler 1210 connected to a beam outlet 1215 which can be surrounded by a thermal shield 1220. The cavity 1205 can be surround by a vacuum vessel 1225, and a magnetic shield 1230 can surround the cavity 1205. An electron gun 1235 can be used to dispense electrons into the cavity 1205. The system can further include cryocoolers 1240 used to cool the system.

The cavity surface can be prepared by removing 120 μm via electropolishing (EP), 3 hour 800 C vacuum furnace treatment, 20 μm light EP, and high pressure rinsing with water. After initial performance evaluation, the cavity's inner surface can be coated with a ~2 μm thick layer of $Nb_3Sn$, grown via vapor diffusion, to enable low dissipation operation near 4.5 K. The cavity can then be cooled in 4.4 K liquid helium in a vertical test stand (VTS) to obtain a baseline of quality factor, $Q_0$ vs. cw accelerating gradient, $E_{acc}$. The cavity can then be warmed, removed from the VTS, and prepared for conduction cooling without disturbing the inner vacuum.

In certain embodiments, a thermal conduction link of 5 N aluminum (with a purity >99.999%) can be machined out of stock plates, cleaned to remove surface oxide, and bolted to the cavity niobium rings. The bolting procedure involves interposing a 4 mil thick foil of indium between the niobium and aluminum plates and pressing the contact with 2 kN force applied by a silicon bronze screw, a brass nut, and optionally, stainless steel Belleville disc springs. The other termination of the thermal link can be bolted to the 4 K stage of a pulse tube cryocooler. The cavity-thermal link assembly can then be installed on an assembly comprised of a vacuum vessel, a magnetic shield (an enclosure with ~10 mG background), a thermal radiation shield, and a Cryomech PT420 two-stage pulse tube cryocooler (rated to provide cooling of 2 W @ 4.2 K with 55 W @ 45 K). An RF power source can supply 10 W at 650 MHz of cw power to the cavity, measure the forward, reflected and transmitted powers, and lock the source frequency to the instantaneous resonance frequency of the cavity. For recording temperature of the cavity-cryocooler assembly, four cryogenic thermometers can be affixed to the niobium rings and another can be affixed to cryocooler on its 4 K stage. Additional details are provided herein.

FIG. 1A illustrates a standard single cell elliptical cavity 100 for accelerator applications. In certain embodiments, the single cell elliptical cavity 100 can comprise a superconducting radio frequency (SRF) niobium cavity. However, in other embodiments, the elliptical cavity 100 can be comprised of other materials and can be used, for example, for a linear accelerator, or other such accelerator. It should also be appreciated that the methods and systems can be applied to other cavity arrangements, including the multi cell cavity illustrated in FIG. 2.

FIG. 1B illustrates that the elliptical cavity 100 includes conduction cooling rings 105 connected to the body of the cavity 100. FIG. 1B shows two conduction cooling rings but additional or fewer conduction rings can be used in other embodiments. In certain embodiments, the cooling rings 105 can be niobium rings that are welded to the body of the cavity 100. The cooling rings 105 can be provided as quarter circle sections so that four of the sections complete a single ring around the body of the cavity 100. The rings 105 can include a plurality of mounting holes 110. The mounting holes are preferably equidistant from one another, but can be arranged in other ways to maximize conductivity.

The conduction cooling rings further include a series of cutouts 115. A newly constructed SRF cavity requires chemical cleaning, high pressure water rinsing, baking, and coating before it can be installed on a particle accelerator. The ring cutouts 115 provide space for interfacing the cavity with the cleaning/baking machines.

FIG. 1C illustrates the conduction link 150 associated with the thermal conduction cooling arrangement. Various components associated with the conduction link can be made of copper. The thermal conduction link 150 comprises ring mounts 155 with holes 157 that match the holes 110 on the cooling rings 105 welded to the elliptical cavity 100. The ring mounts 155 are then connected to a conduction bus 160 via a set of ear-straps 165. The ear-straps 165 can be bound to the ring mounts 155 and the conduction bus 160 with a series of one or more fasteners. The conduction bus 160 is then, in turn, connected to a cold head 170 via a cryocooler 4K stage 175 and conduction mounting bracket 180. The conduction mounting bracket 180 can be bolted to the cryocooler 4K stage 175 and to the conduction ring link 185. This arrangement creates a thermal pathway between a cooling unit (e.g. cryocooler, or other such cooling unit) and the cavity 100.

Specifically, in a resonating cavity with the accelerating mode concentrated in the equatorial region of the elliptical cell, the majority of power (i.e. thermal energy) is dissipated in the surface near the cell equator. As such the cooling rings are attached to the cavity cell near its equator. In certain embodiments, flat faces can be machined on the cell outer wall where cooling rings 105 made of niobium (Nb) can be welded to the cell. A ring mounts made of high purity (5N) aluminum (Al) can then bolted to the cooling rings. The ear-straps can be configured to be flexible and can accommodate differential thermal contraction during cooldown. The conduction bus 160 can be thicker to ultimately provide a thermal pathway to the cryocooler(s).

It should be appreciated that, for the thermal pathway to operate efficiently, solid contact is required between all of the various components of the conduction link 150. To that end, numerous connecting members are used to interconnect the conduction link components, and to connect the conduction link 150 to the cooling rings.

Figure 3A:
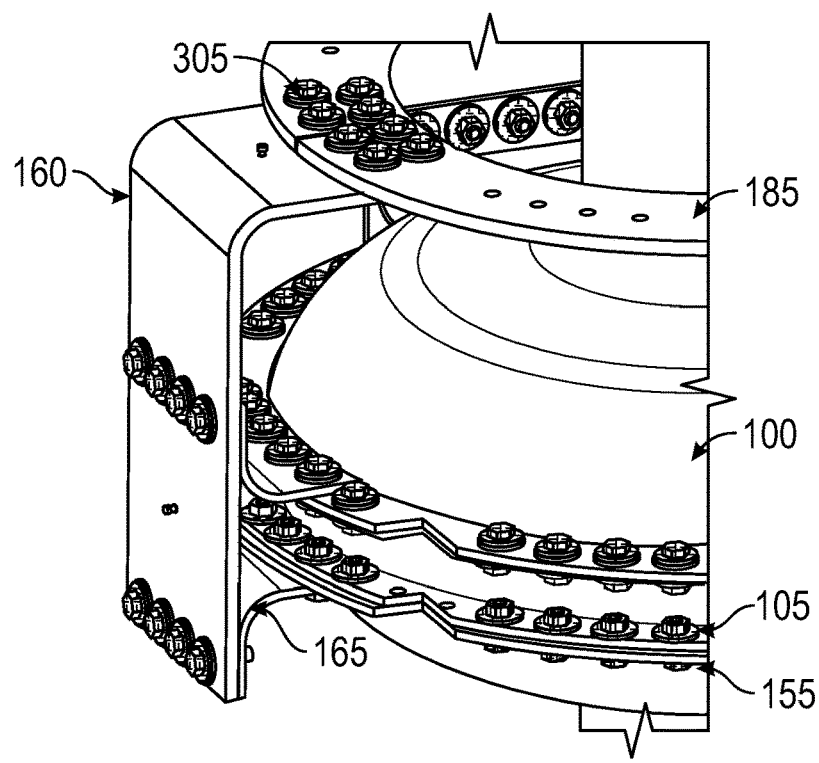
FIG. 3A depicts connection assemblies to connect a cooling ring and conduction link, in accordance with the disclosed embodiments.
Figure 3B:
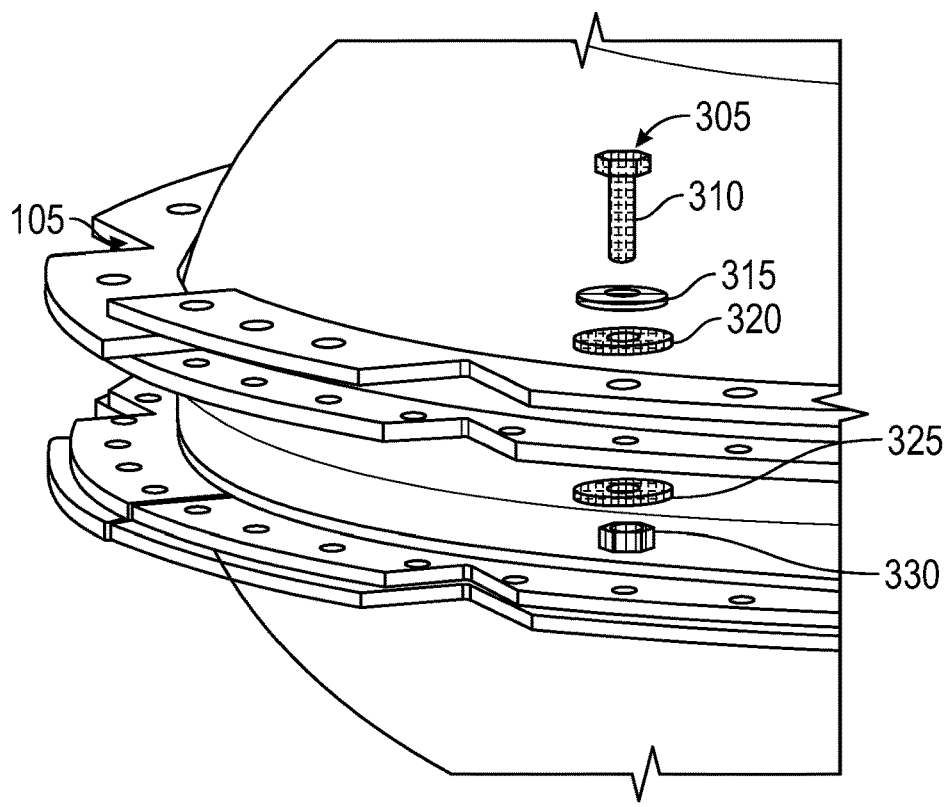
FIG. 3B depicts connection assemblies to connect the cooling ring and conduction link, in accordance with the disclosed embodiments.

However, as noted above, aluminum shrinks more than other materials (whether brass or bronze). As such, in certain embodiments, the screws and the bolts can be made of different materials. This is illustrated in FIGS. 3A and 3B. FIG. 3A illustrates the use of connection assemblies 305 to connect the niobium cooling ring and conduction link 150. It should be appreciated that many of the connection assemblies 305 can be used in various embodiments to bind any of the parts of the conduction link 150. In other embodiments, the niobium cooling ring 105 and conduction link 150 can be explosion bonded together.

The connection assemblies 305 can comprise a bolt 310, a disc spring 315, a top washer 320, a bottom washer 325 and a nut 330. In certain embodiments, the nut 330 can be formed of silicon bronze. The bolt 310, top washer 320 and bottom washer 325 and can all be formed of brass. In other embodiments, the bolt can be formed of silicone bronze and the nut can be made of brass. It is preferential for the material of the nut and bolt to be different materials to prevent galling. The disc spring 315 is optional and can be formed of steel, or Beryllium Copper.

Figure 4:
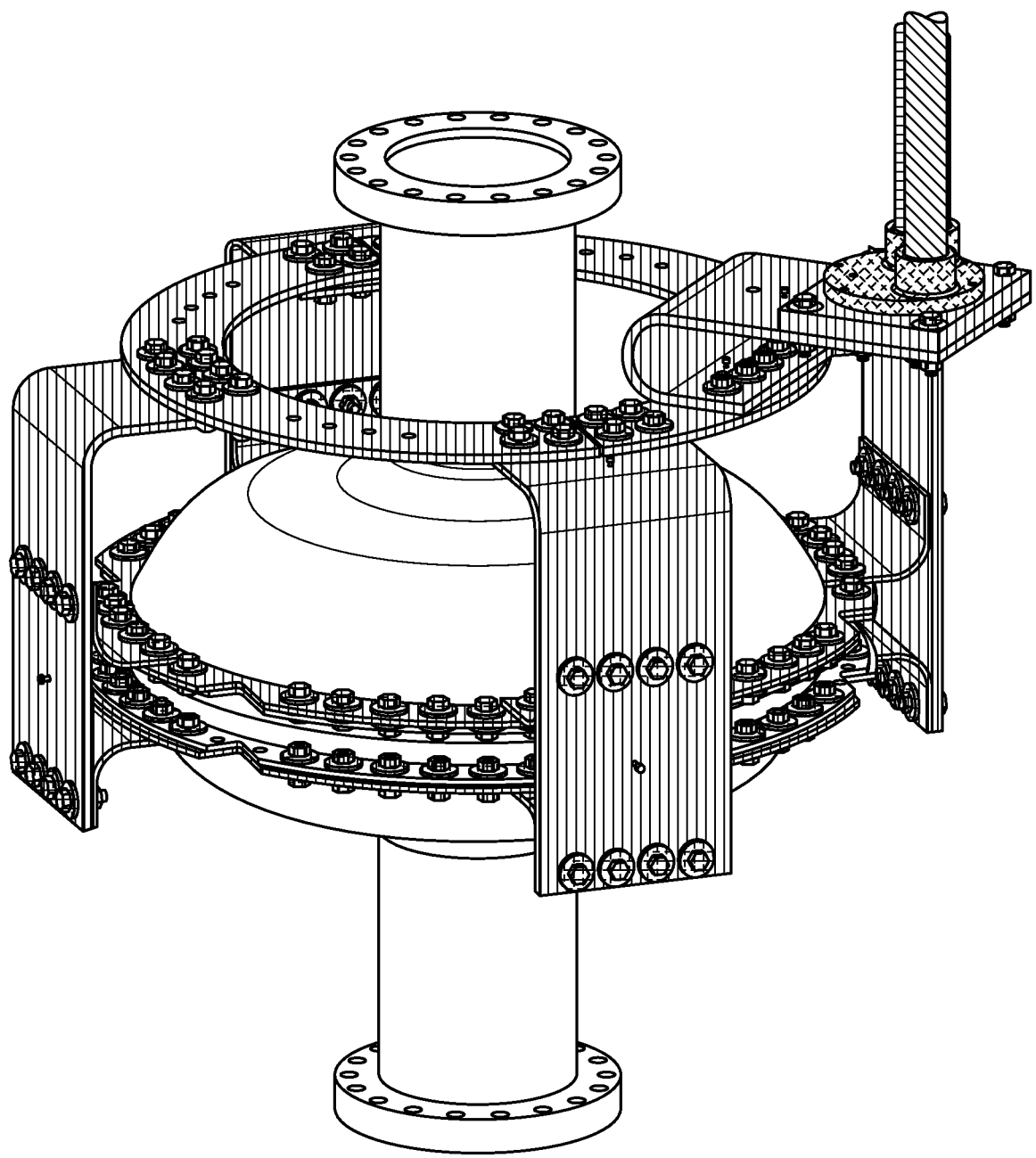
FIG. 4 depicts a configuration of the conduction link, in accordance with the disclosed embodiments.
Figure 5:
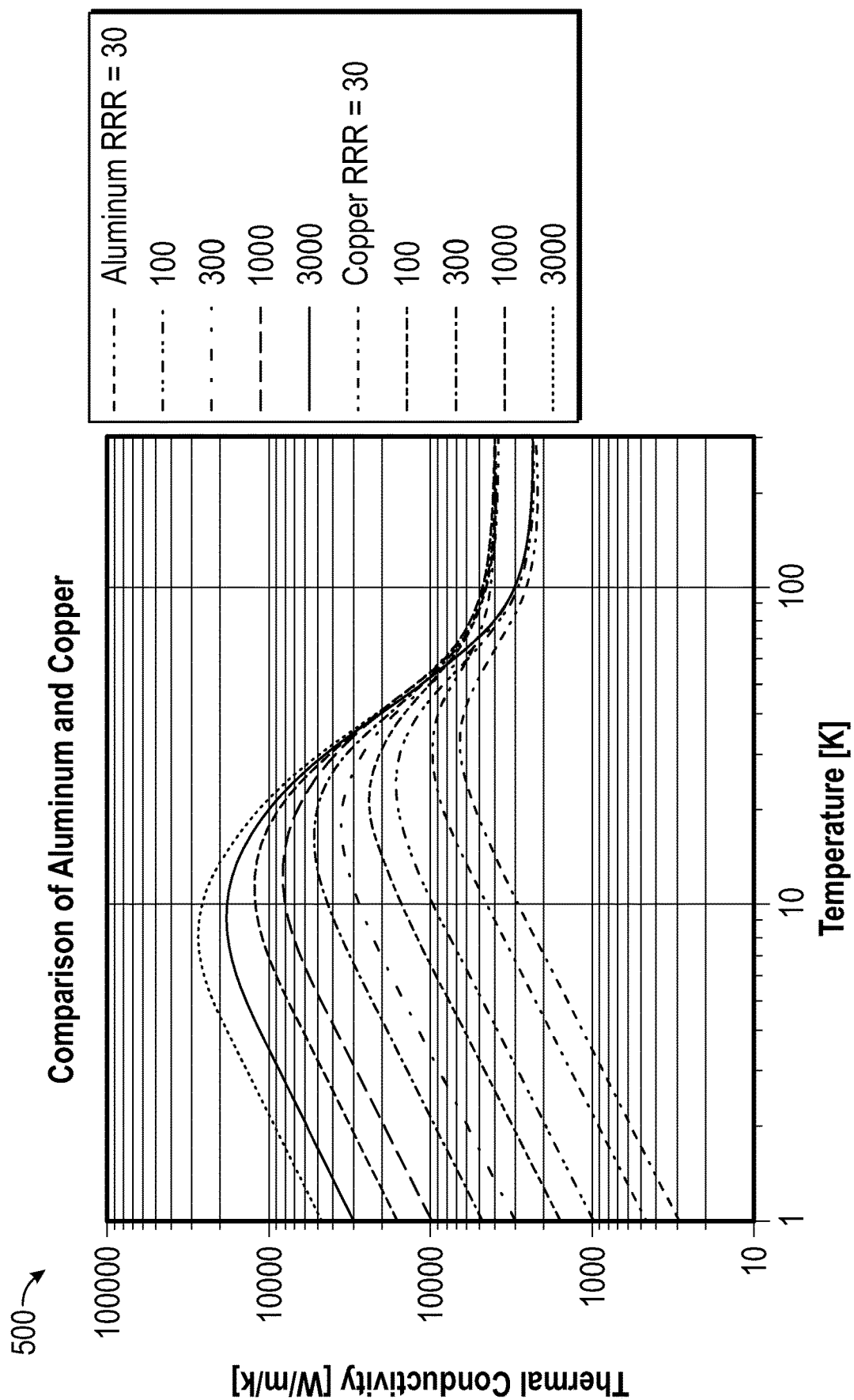
FIG. 5 depicts a chart illustrating thermal conductivity as a function of temperature, in accordance with the disclosed embodiments.

An aspect of the disclosed embodiments is the material selection for the connection assemblies 305 and the conduction link 150. FIG. 4 illustrates the configuration of the conduction link 150 of copper (as opposed to other prior art materials used, as illustrated by chart 500 in FIG. 5). In certain embodiments, the copper used for the conduction link 150 components can comprise high purity copper. The copper can be selected to have a conductivity less than or equal to $1 \times 10^4$ W/(M*K) at temperatures of approximately 4 K.

This material selection provides a major advantage over prior art approaches in that, amongst the materials in contact with one another, (i.e. the niobium cavity, copper conduction link 150, and connection assemblies, which may be brass or bronze), the connection assembly material experiences the greatest thermal contraction as the temperature of the components is brought from room temperature to near 4 K. As a result, the cooldown process will tighten joints between the copper conduction link 150 and the niobium cooling rings 105, thereby maintaining or even increasing the mechanical pressure without requiring any additional pressure retention measures in the connection assembly 305 (e.g. the disc spring).

Furthermore, removing or reducing unnecessary pressure retention measures in the assembly creates a major advantage. Specifically, SRF cavity performance is sensitive to magnetic fields. Extraneous steel pieces can affect the magnetic field and degrade performance of the SRF cavity. Thus, using copper for the conduction link will eliminate the risk of performance degradation. In addition, copper is less prone to oxidation as compared to prior art materials, and copper surface oxides can be easily removed using a simple scrubber.

In sum, advantages of the disclosed embodiments include that the copper surface oxide is easier to clean than aluminum surface oxide. This facilitates preserving cleanliness of joint surfaces, which helps to keep the joint thermal resistance low. In addition, existing aluminum-niobium and aluminum-aluminum joints are interposed with a thin foil of pure indium. The use of copper is advantageous as compared to aluminum because Indium cold welds to copper and therefore yields lower joint thermal resistance. Rather than simply pressing a thin foil of indium, a thin layer of indium can be plated on copper to produce joints with even smaller joint thermal resistance. If indium is not to be used at the joints, the copper surface can be gold plated to lower the joint resistance. In general, gold plating over copper is more stable and adherent than gold plating on aluminum.

Figure 6:
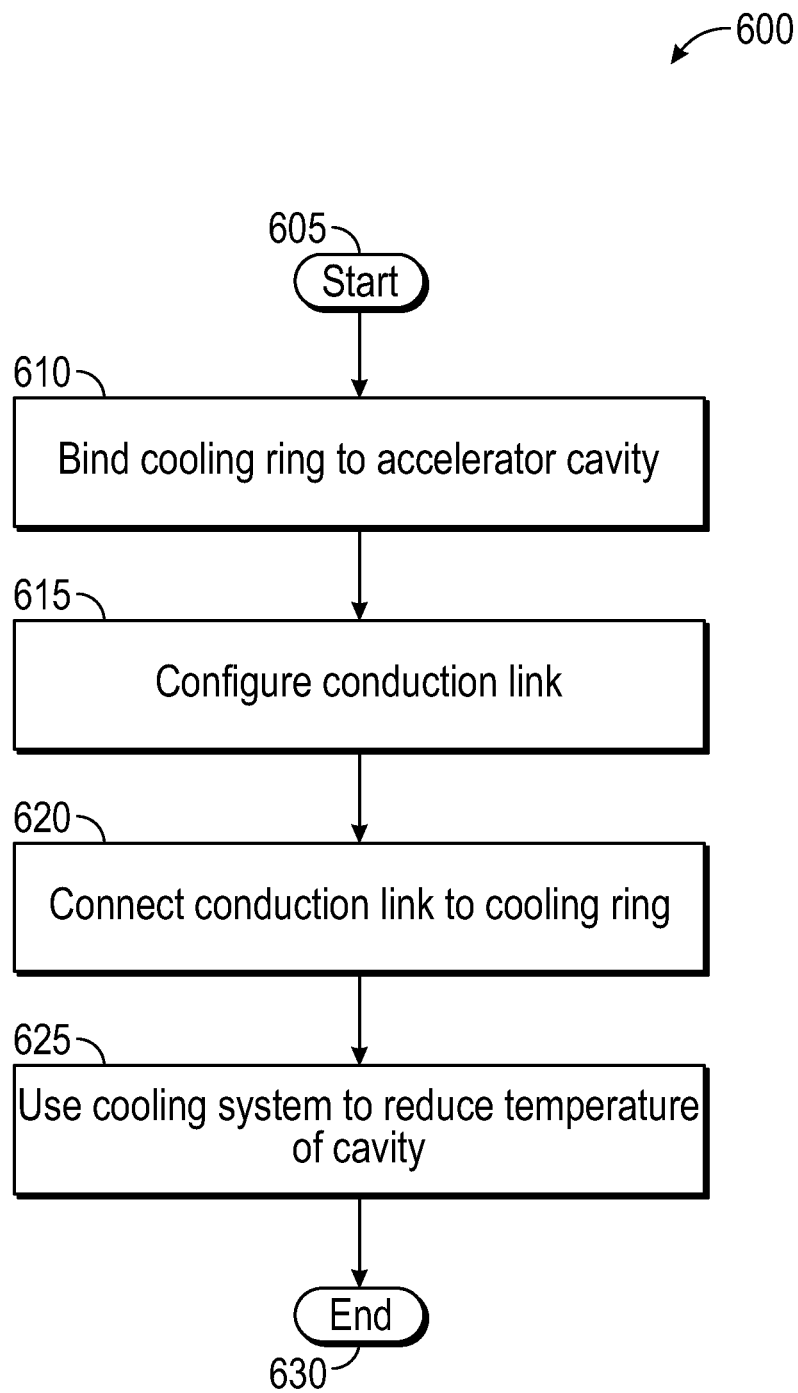
FIG. 6 depicts steps associated with a method for fabrication of a conduction cooling assembly, in accordance with the disclosed embodiments.

FIG. 6 illustrates a method associated with fabrication of a conduction cooling assembly in accordance with the disclosed embodiments. The method begins at 605. At 610, at least one conduction ring can be bound to the body of an accelerator cavity. The conduction ring can comprise niobium. In certain embodiments, the conduction ring can be welded to the cavity and can be located on or near the equatorial surface of the cavity.

Next at 615 a copper conduction link can be configured. The conduction link can include ring mounts 155 with holes 157 that match the location of holes 110 on the cooling rings. The ring mounts 155 can be connected to a conduction bus 160 via set of ear-straps 165. The ear-straps 165 can be bound to the ring mounts 155 and the conduction bus 160 with a series of one or more fasteners. The conduction bus can be connected to a cold head 170 via a cryocooler 4K stage 175 and conduction mounting bracket 180. The conduction mounting bracket 180 can be connected to the cryocooler 4K stage 175 and to the conduction ring link 185.

At step 620, the conduction link can be connected to the cooling ring with a plurality of connection assemblies 305. Once the connection assemblies are engaged, a cooling system can be used to reduce the temperature of the conduction link and SRF cavity as shown at 625. As the temperature of the system decreases the various components of the system experience a thermal contraction as shown at 630. Because the connection assemblies experience the most thermal contraction, the cooling process increases the mechanical pressure between the conduction link and the cooling ring. The method ends at 635.

Figure 7A:
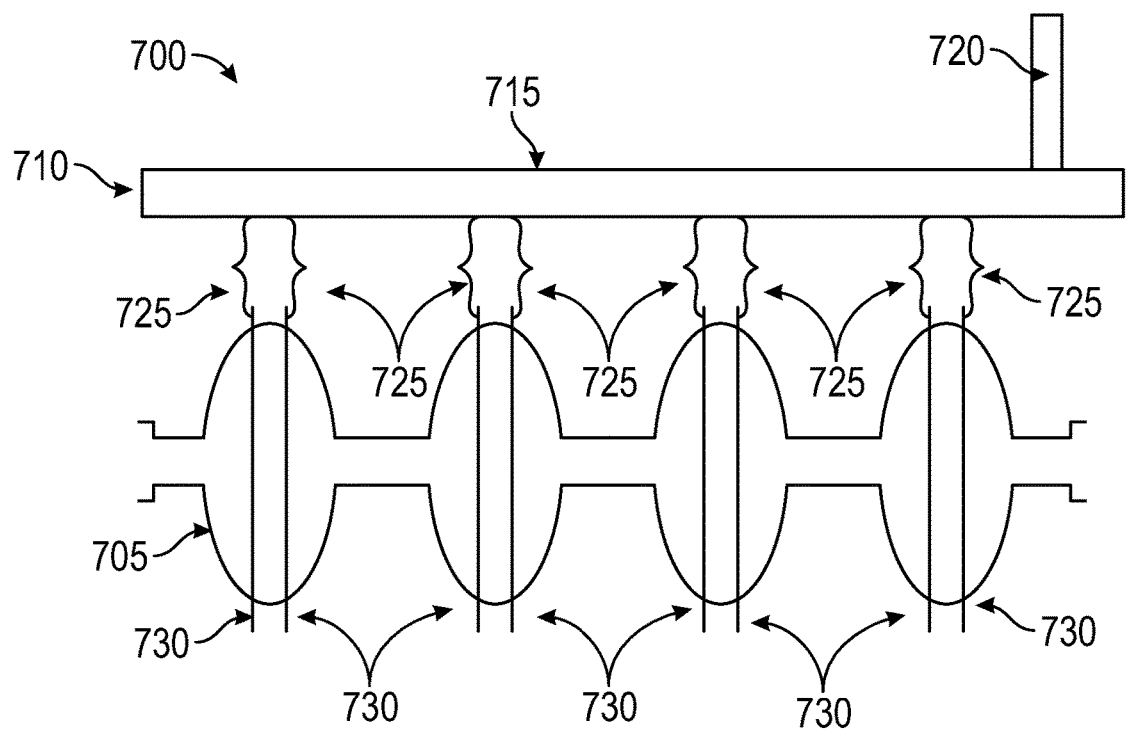
FIG. 7A depicts a system for conduction cooling an accelerating structure, in accordance with the disclosed embodiments.

FIG. 7A illustrates another embodiment of a system 700 for conduction cooling an accelerating structure. In the embodiment illustrated, the accelerating structure is shown without a particle source. However, it should be appreciated that a particle source can be integrated in an accelerator with a half-cell arrangement on one end of the accelerator, without departing from the scope of the embodiments disclosed herein.

The accelerator structure 705 can comprise a multi-cell conduction cooled SRF accelerator. The accelerator structure 705 can be equipped with a conduction cooling assembly 710. The conduction cooling assembly 710 (and the remaining embodiments illustrated in FIGS. 7-11) can generally comprise one or more elements and/or principles disclosed in FIGS. 1-6 and/or 12 above.

Figure 7B:
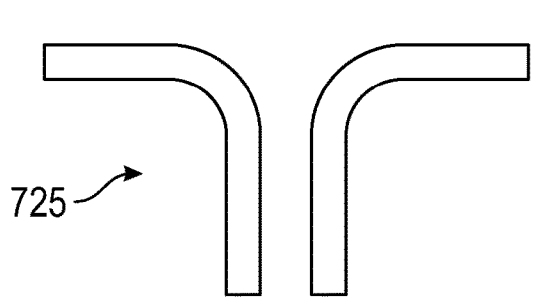
FIG. 7B depicts a flex element associated with a conduction cooling assembly, in accordance with the disclosed embodiments.
Figure 7C:
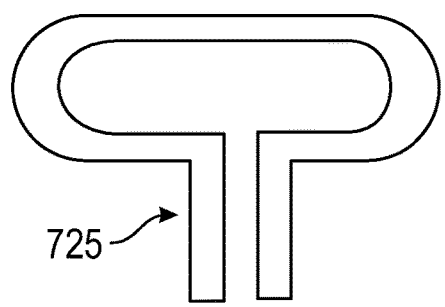
FIG. 7C depicts a flex element associated with a conduction cooling assembly, in accordance with the disclosed embodiments.

For example, the conduction cooling assembly 710 can comprise a bus bar 715 formed of copper or aluminum. The bus bar 715 is attached to a cold tip 720 of a refrigeration source. The refrigeration source can comprise a cryocooler, liquid helium bath, or other such refrigeration source. The bus bar 715 is also connected to one or more flex elements 725 (i.e. ear straps), the flex element also being configured of copper or aluminum. The flex element 725 is essentially a strap of metal comprising one or more thin metal sheets with in-built flexibility. The flex element 725 can take various shapes. Two such shapes are illustrated in FIGS. 7B and 7C.

Cooling rings 730 can be bound to the accelerator structure, and thermally connected to the flex elements 725. The cooling rings can be configured on each cavity of the accelerator structure. It should be noted that two cooling rings are shown in the figures, but more or fewer rings could be used in other embodiments. The cooling rings can be formed of niobium or can be copper with an outer coating of niobium.

The system 700, illustrated in FIG. 7A can be assembled to maximize the thermal conductivity between the conduction cooling components 710 and the cavity 705. For example, the cold bar can be connected to the cold tip by bolting, interposed with indium or Gallium Indium tin alloy. In other embodiments, surfaces of the cold bar and cold tip can be gold plated to improve the thermal conductivity between the surfaces of the cold bar and cold tip that are in contact. Screws or bolts used for the connection can be selected to be a material with a larger thermal contraction rate than the material used to form the cold tip and cold bar. Be—Cu disc springs can optionally be included to maintain tension.

The connection between the cold bar and the flex elements can be achieved with bolting using the same principles as those for the cold bar and cold tip. Similar mounting strategies can be used for the connection between the flex elements and the cooling rings. These connections may not require disc springs, but disc springs may be optionally included.

The connection of the cooling rings to the cavity can be achieved in several ways. The first is with electron beam welding. In other embodiments, the connection can be made with cold spraying or additive manufacturing. The key is to establish a connection that yields very high thermal conductivity.

In general, material selection and design can be done to ensure the required thermal conductance of the cooling system 700 is achieved; that is, the connection between the cold bar, flex elements, and cooling rings. Equation (1) describes the desired relationship:

$$(V_{acc})^2 / [(R/Q) * Q_0(T_{cav})] = Q_{cooler}(T_c) = K_{structure} * (T_{cav} - T_c) \quad (1)$$

In equation (1) $V_{acc}$ represents the accelerating voltage generated by SRF cavity. R/Q represents resistance divided by the quality factor. $Q_0$ represents the intrinsic quality factor of the cavity. $T_{cav}$ represents cavity temperature. $Q_{cooler}$ represents the cooling power of the cooler. $T_c$ represents the cryocooler temperature. $K_{structure}$ represents the thermal conductance of the conduction cooling structure.

Figure 8A:
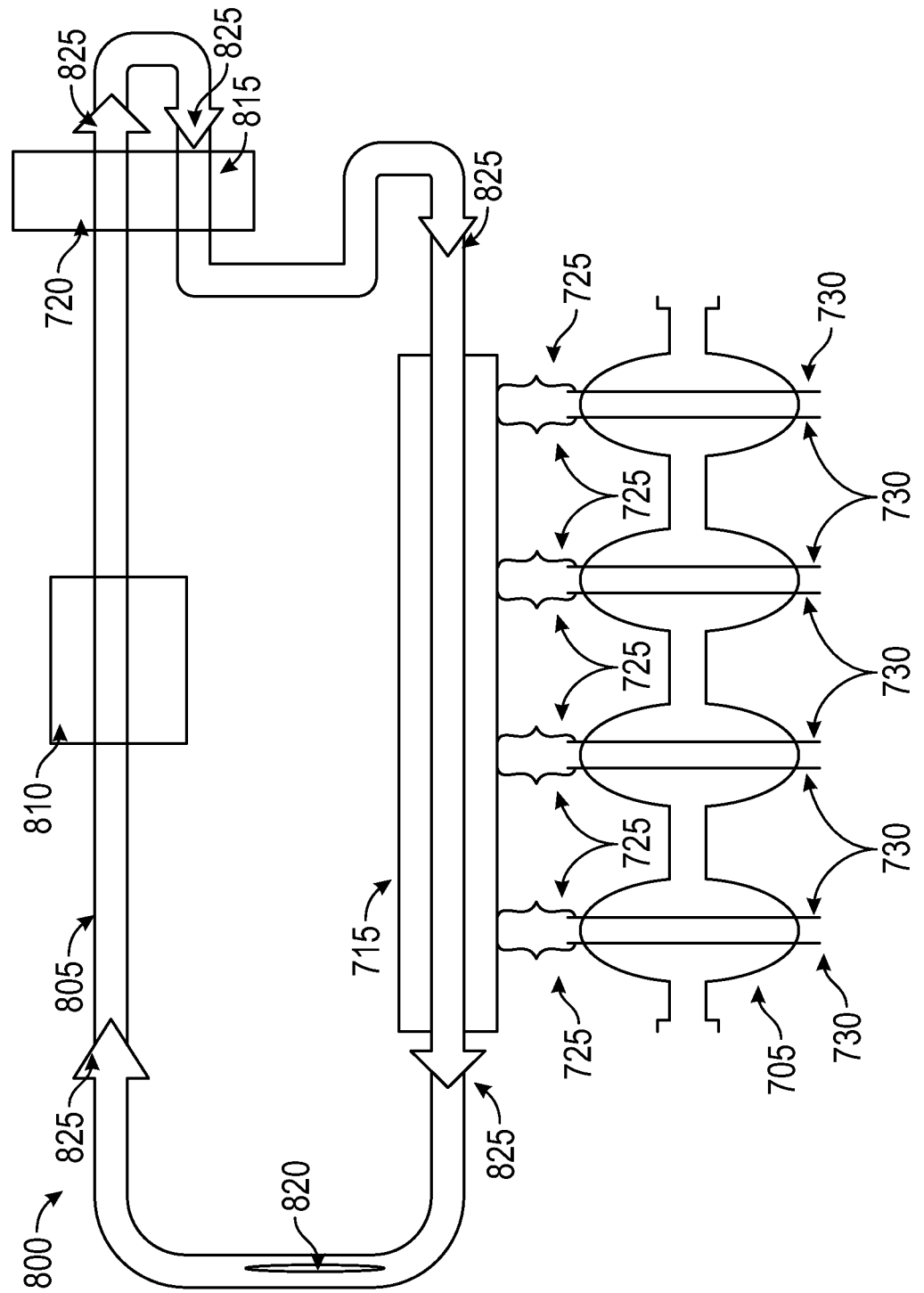
FIG. 8A depicts a cavity cooling system, in accordance with the disclosed embodiments.

FIG. 8A illustrates an embodiment of a cavity cooling system 800 that can use forced convective gas flow to cool an accelerator cavity. The system 800 includes a conduit 805 through which a compressed gas 820 can flow. The conduit 805 runs through, or is otherwise in thermal contact with, the cold bar 715 and cold tip 720.

A cryogenic circulator 810 can be used to circulate gas 820 through the conduit 805. Gas 820 can comprise pressurized helium gas or neon gas (in embodiments for cryogenic normal conducting cavities). The arrows 825 illustrate the direction of gas 820 flow through the conduit 805. The cryogenic circulator 810 can comprise a cryofan or centrifugal compressor. The cryogenic circulator can force gas into a heat exchanger 815. The cold bar 715 and heat exchanger 815 can be formed of copper while the conduit 805 can be made of stainless steel. In certain embodiments the conduit 805 can be mounted on or in the cold bar 715 via soldering or brazing.

Gas 820 exiting the heat exchanger is cold (near or below 5 K). The cooled gas enters the cold bar 715. Heat conducted from the cavity 705 is transferred to the cooled gas 820 flowing through the conduit 805 in the cold bar 715. The heat transferred to the gas is then driven via convective gas flow out of the cold bar 715 by the cryogenic circulator 810. The now warmed gas 820 is then driven back into the heat exchanger 815 and cold tip 720 where it is re-cooled and then circulated back to the cold bar. In this way, the system 800 uses forced convective gas flow to cool the cavity 705.

Figure 8B:
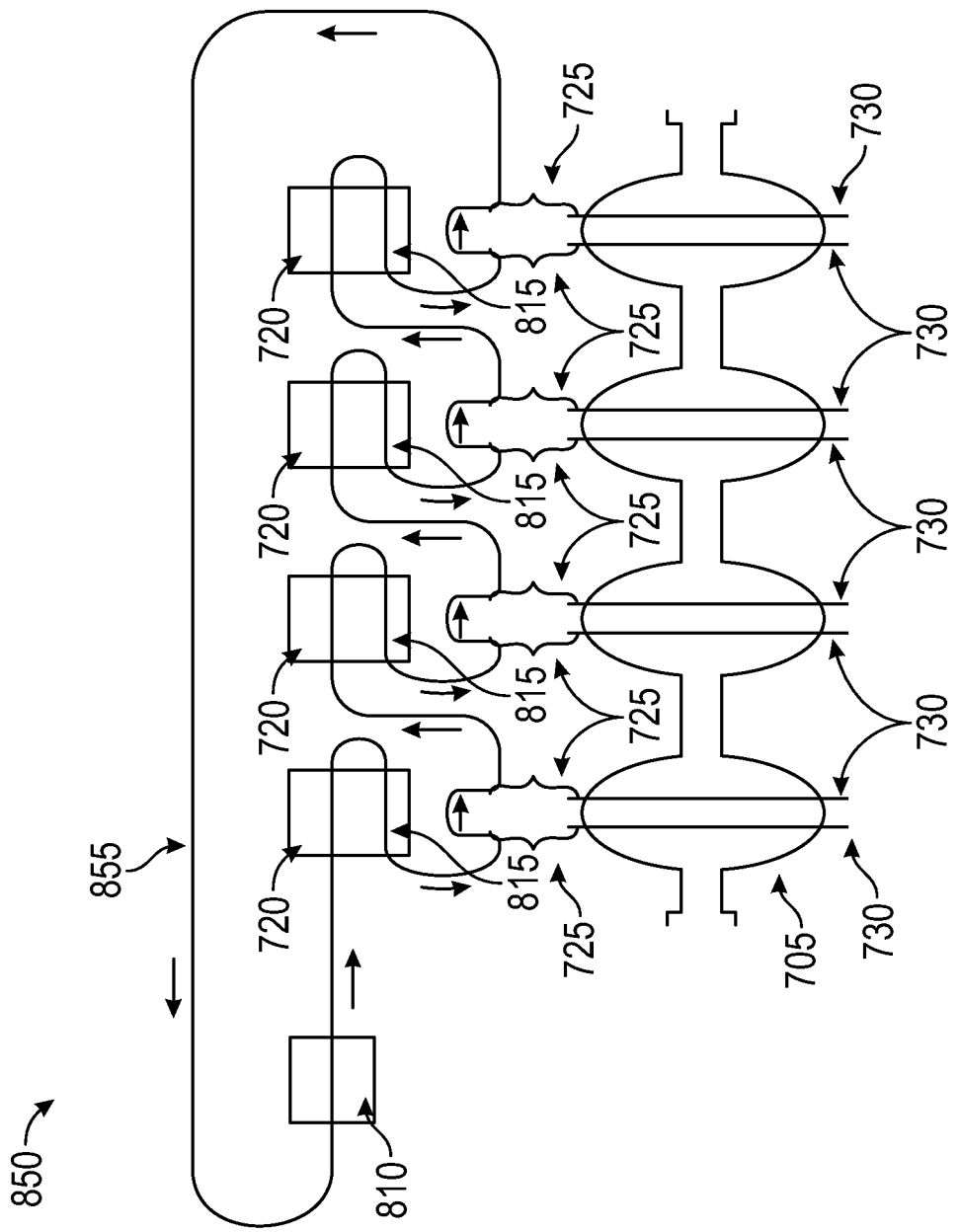
FIG. 8B depicts a forced convective gas flow system to cool a cavity, in accordance with the disclosed embodiments.

FIG. 8B illustrates an alternative embodiment of a forced convective gas flow system 850 to cool a cavity 705. In this embodiment, multiple cold tips 720 and heat exchangers 815 can be used. In the embodiment, conduit 855 serves to transport compressed gas 820 through multiple cold tips 720 and heat exchangers 815. The gas is forced through the conduit 855 by cryogenic circulator 810.

The system 850 does not rely on a cold bar. Instead, the compressed gas in the conduit 855 passes through a cold tip 720 and heat exchanger 815. The conduit can be in thermal contact with the flex elements 725, which are bound to the cooling rings 730 on each cell of the cavity. After the heat from the flex elements 725 is conducted into the flowing gas 820, the gas is driven to another cold tip 720 and heat exchanger 815 where the thermal energy is transferred via the heat exchanger, before the re-cooled gas 820 is introduced to the next set of flex elements 725 associated with the next cell in the cavity 705. The system 800 thus, makes use of multiple smaller cooling sources to cool the passing gas 820 before it reaches the next cell of the cavity 705.

Figure 9A:
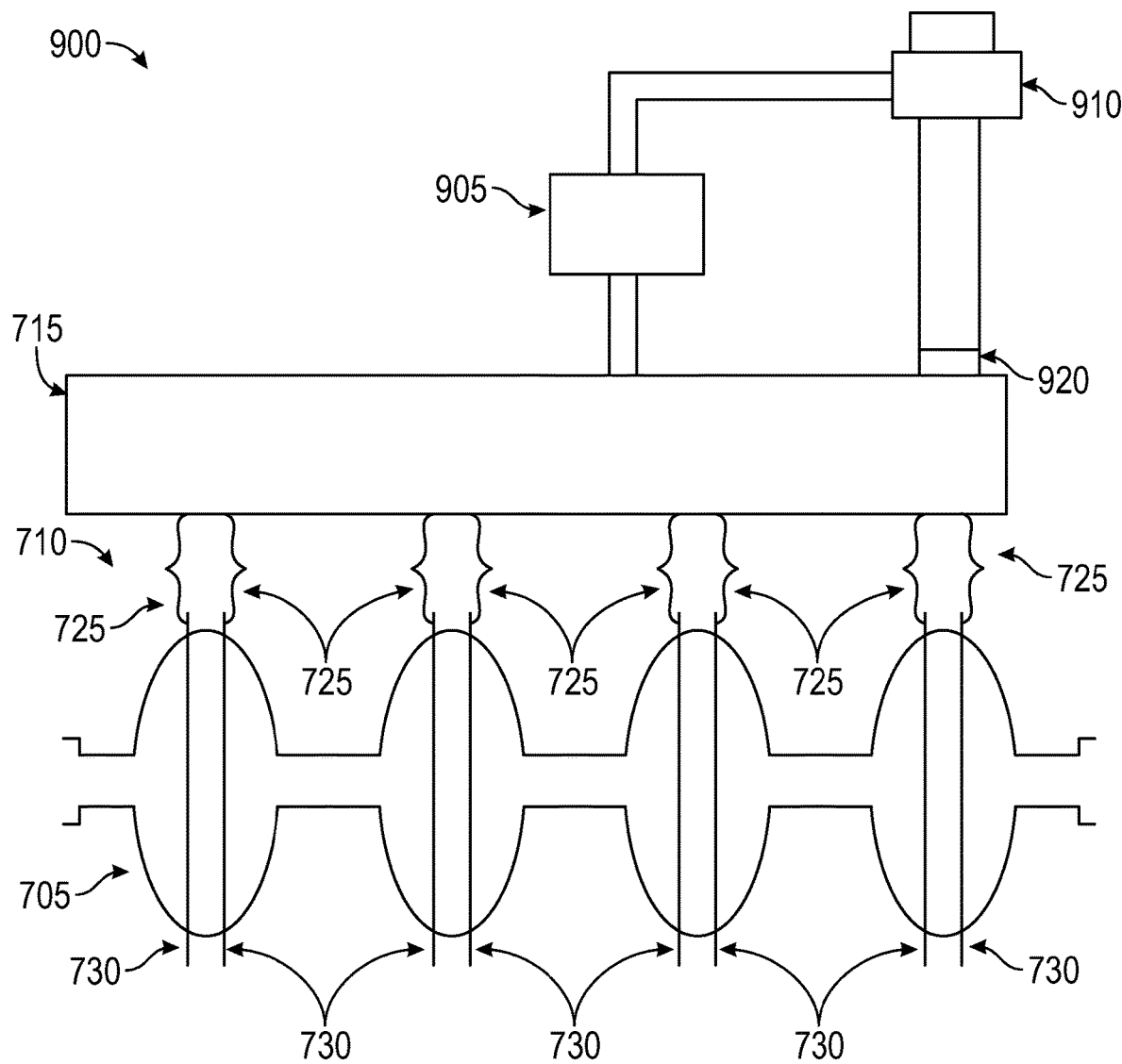
FIG. 9A depicts a fast conduction cooling system, in accordance with the disclosed embodiments.
Figure 9B:
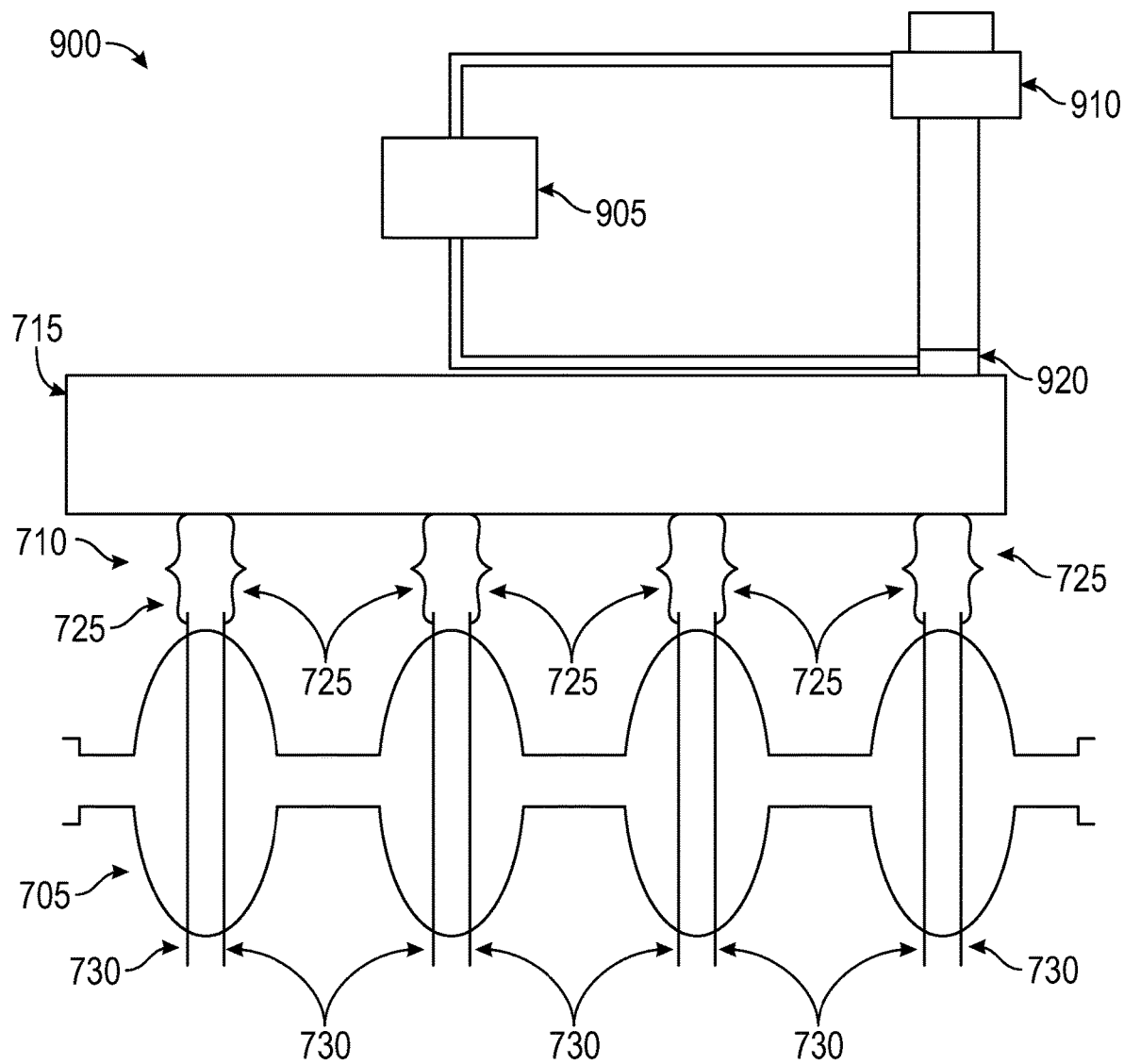
FIG. 9B depicts another embodiment of a fast conduction cooling system, in accordance with the disclosed embodiments.

In another embodiment, a fast conduction cooling system 900 is disclosed as illustrated in FIGS. 9A and 9B. Prior approaches to conduction cooling have focused on cavity heat removal when the cavity is already near 4 K at which point the cavity is operating with RF. However, no systems or methods are currently capable of enabling fast cooldown of the cavity from room temperature to the operating temperature near 4 K. For reference, the typical conduction cooled device requires a cooldown to 4K over several days. For example: the IARC test SRF cavity at FermiLab takes 2-2.5 days to cooldown from room temperature to 4K. In the field the cooldown time will reduce the 'availability' of an accelerator, so a fast cooldown is always favorable.

FIG. 9A illustrates a system 900 wherein a thermal connection to an SRF cavity is used in stages, to cool the cavity from room temperature to the warmer (40 K) stage of a cryocooler(s) during the cooldown phase. The 40 K stage has much higher cooling capacity than the 4 K stage, so a faster cooldown can be achieved by connecting the cavity there. A key is for the connection to have high thermal conductance at the start of cooldown from room temperature (so that cooldown rate is high) and low thermal conductance when the cavity approaches its cold operating temperature (to minimize the static heat leak from the 40 K stage to the cavity near 4 K).

The system 900 makes use of one or more first stages 910 of a two stage cryocooler. The first stage 910 is configured to provide cooling power at temperatures greater than 30 K. Stage two (or the second stage) 920 provides cooling power at 3 K and above. It should be appreciated that, as used herein, a cryocooler stage and a cold tip can refer to the same aspect. Thus, a two stage cryocooler as illustrated in FIG. 9 has two cold tips. The first stage 910 is connected to the cold bar 715 via a heat switch or thermal switch 905. The thermal switch 905 comprises a thermal shunt from the first stage 910 cryocooler to the cold bar 715. The thermal shunt enables a much faster cooldown of the conduction cooling system and cavity from room temperature to the cavity operation temperature near 4 K. It is important to note that the thermal conductance of the thermal switch 905 is temperature dependent. At higher temperatures the thermal conductance is high. As the temperature decrease the thermal conductance also decreases.

FIG. 9B illustrates an alternative embodiment of the system 900. In this embodiment, the thermal switch is configured between the first stage 910 and the second stage 920. This alternative arrangement can similarly cool the cavity from room temperature to the warmer (40 K) stage of a cryocooler(s) during the cooldown phase.

FIGS. 10A-10D illustrate a thermal switch 905 in accordance with the disclosed embodiments. The thermal switch 905 can comprise a gas gap heat switch. The thermal switch can include a conductor path 1005 to the first stage 910 of the cryocooler and a conductor path 1025 to the cooling bar 715. The body 1010 of the thermal switch 905 can comprise a thin walled cylinder or paraboloid. The body 1010 can be configured of steel or other such material with low thermal conductivity.

A series of warmer fins 1015 can be configured on the body 1010. The warmer fins 1015 extend down from the conduction path 1005 side of the body 1010. A series of cooler fins 1020 can extend upward from the conductor path 1025 side of the body 1010. The fins can be rectangular or concentric cylinders. In certain embodiments, the warmer fins 1015 and cooler fins 1020 can occupy an overlapping region 1030 on the body 1010. The warmer fins 1015 and the cooler fins 1020 can also be arranged to alternate in the overlapping region. The space 1035 inside the body 1010 can be filled with gas 1040. The gas 1040 can be nitrogen, argon, neon, or any other gas that has a high vapor pressure above 35-40 K, but a very low vapor pressure near the temperature of the cavity (4 K).

As the system cools from room temperature, the gas pressure is high, thereby offering higher thermal conductance between the first stage 910 of the cryocooler and the cooler bar. This facilitates a fast cooldown of the conduction cooling system. However, as the components cool down, the gas 1040 inside the body 1010 also cools and begins to condense and/or de-sublimate on the fins 1015 and 1020 inside the body 1010. As the pressure of the gas 1040 in the body 1010 reduces (as a result of the condensation/de-sublimation) the thermal conduction of the thermal switch 905 decreases.

At low enough temperature, almost all of the gas 1040 inside the thermal switch 905 condenses and/or de-sublimates. As a result, the thermal conductance of the thermal switch between the first stage 910 of the cryocooler and the cooling bar is very low. As such, the thermal switch offers high thermal conductance at warm temperatures, but becomes a thermal insulator at cold temperatures.

Figure 10A:
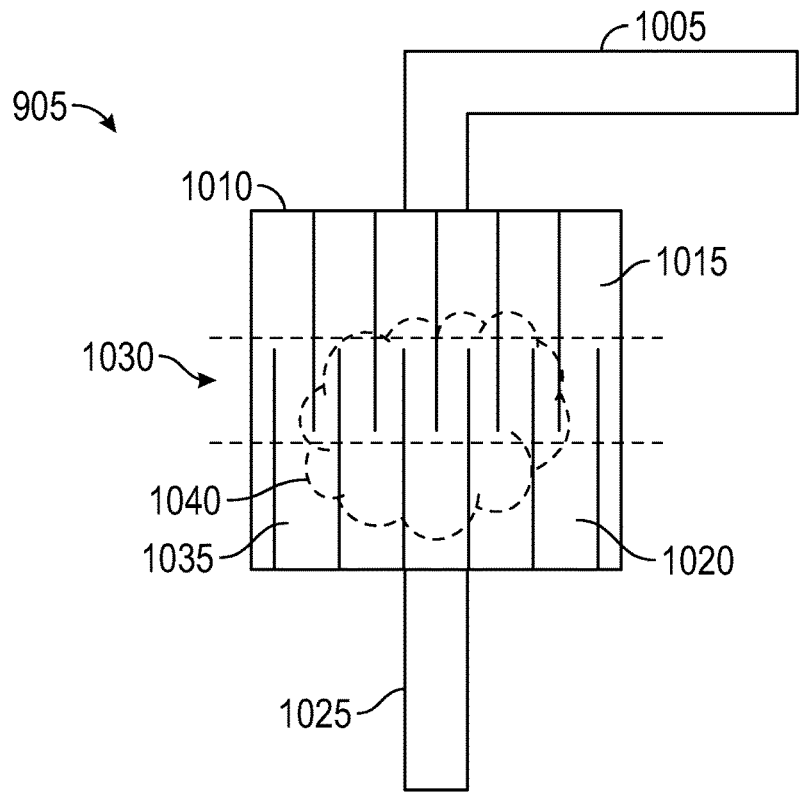
FIG. 10A depicts a thermal switch, in accordance with the disclosed embodiments.
Figure 10B:
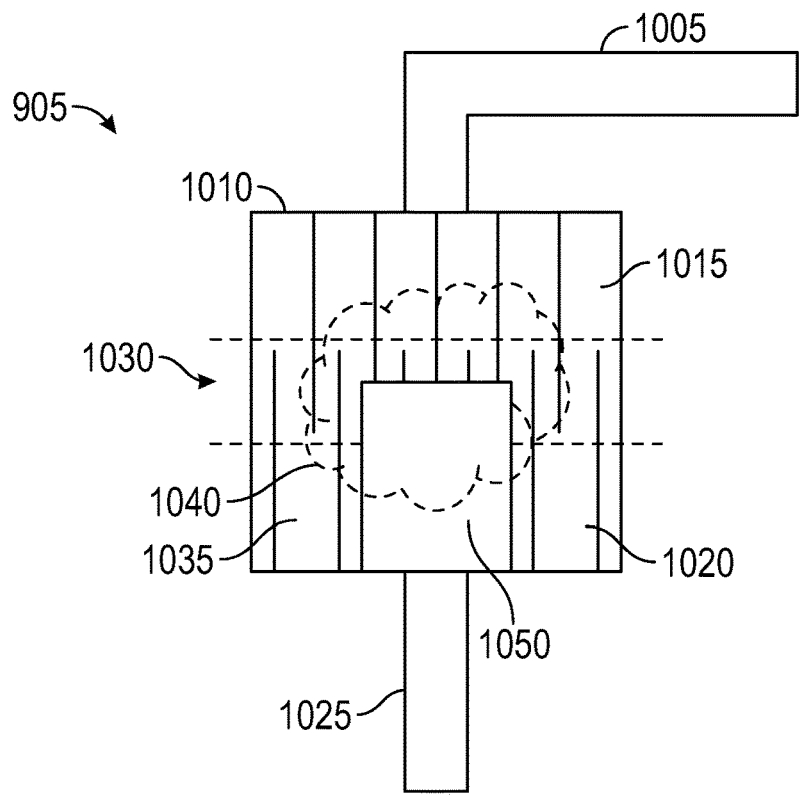
FIG. 10B depicts a thermal switch, in accordance with the disclosed embodiments.

FIG. 10B illustrates another embodiment where a thermal adsorption bed 1050 is incorporated in the thermal switch 905. The thermal adsorption bed 1050 can comprise activated charcoal. The gas in this case can be neon or helium. In this embodiment, as the temperature decreases the gas 1040 is adsorbed on the charcoal bed. Thus, the associated gas pressure in the thermal switch 905 decreases with temperature and the thermal switch 905 switches from a thermal conductor to a thermal insulator.

Figure 10C:
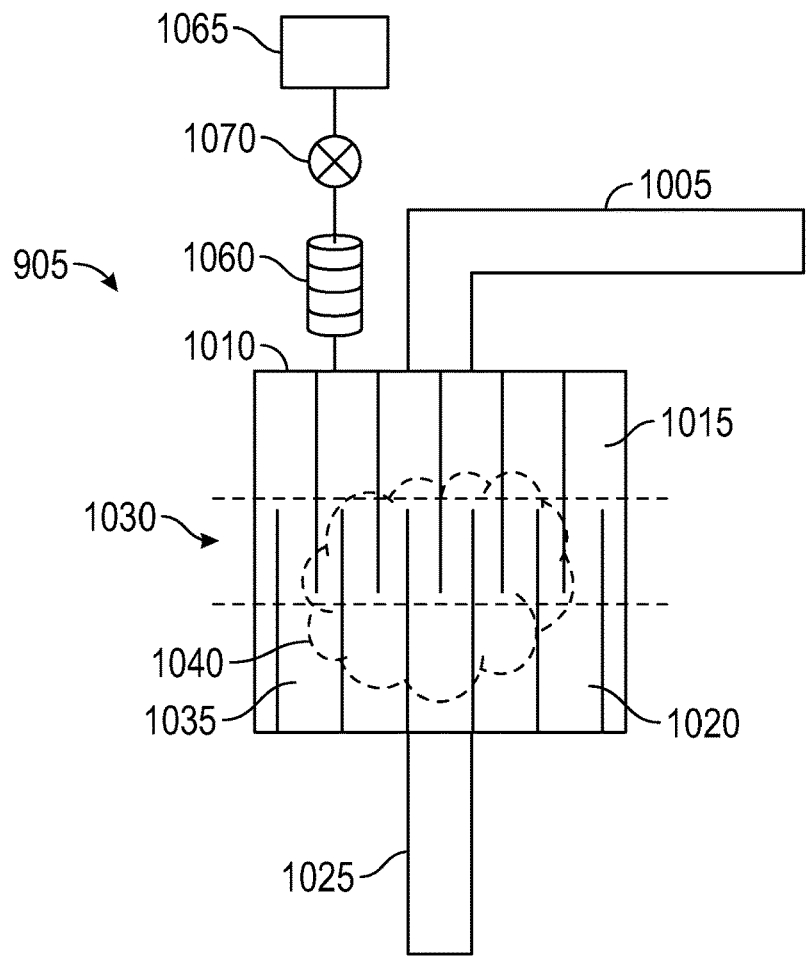
FIG. 10C depicts a thermal switch, in accordance with the disclosed embodiments.

FIG. 10C illustrates another embodiment with a coiled tube 1060 in fluidic communication with the body 1010. The coiled tube 1060 is further attached to a vacuum pump 1065 at room temperature, used for pulling gas 1040. A valve 1070 can be provided to control the gas flow. The gas in this embodiment can be helium.

In this embodiment, at warm temperatures the valve 1070 is closed so that the helium gas 1040 inside the thermal switch body 1010 provides high thermal conductance between the first stage 910 of the cryocooler and the cooling bar. When the temperature of the conduction cooling system has sufficiently cooled, the valve 1070 can be opened (either manually or automatically using a pneumatic device, piezoelectric device, computer control system, etc.) and the gas 1040 can be pumped out of the body 1010 of the thermal switch 905, using the vacuum pump 1065. The removal of the gas 1040 converts the thermal switch to a thermal insulator.

In another embodiment the heat switch 905 can be realized mechanically. In such embodiments, the conductance between the first stage 910 of the cryocooler and the cooling bar can be controlled by mechanically connecting or disconnecting the conductor path 1005 between the second stage cryocooler and cooling bar.

Figure 10D:
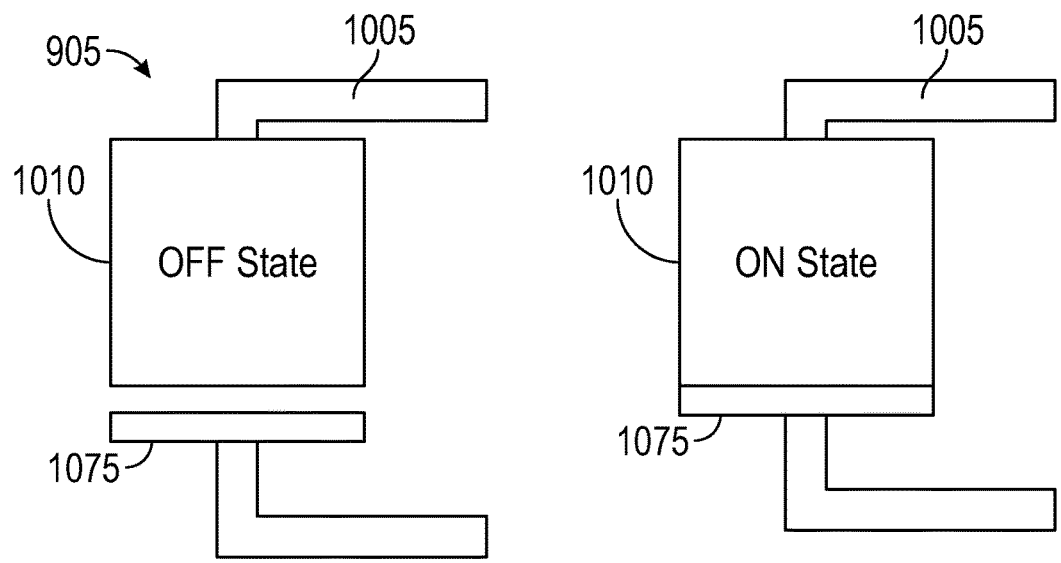
FIG. 10D depicts on and off states of a thermal switch, in accordance with the disclosed embodiments.

FIG. 10D illustrates an embodiment of a mechanical thermal switch 905. In this embodiment, the conductor path 1005 between the first stage 910 of the cryocooler and the cooling bar runs through a mechanical heat switch 905. In the "off state" a thermal contact plate 1075 is mechanically disengaged from the body 1010 of the heat switch 905. In the "on state" the thermal contact plate 1075 is mechanically engaged to the body 1010 of the heat switch 905.

In use, the heat switch can be turned to the "on state" as the temperature cools from room temperature the heat switch serves as a thermal conductor. At the desired cut off temperature, the thermal contact plate 1075 can be disengaged from the body 1010 thus making the heat switch 905 a thermal insulator.

It should be appreciated that aspects of the embodiments disclosed herein can also be used for cryogenic cooling of a normal conducting RF cavity. For example, FIGS. 11A and 11B illustrates an embodiment of an system 1100 for cryogenic cooling of a normal conducting RF cavity.

Figure 11A:
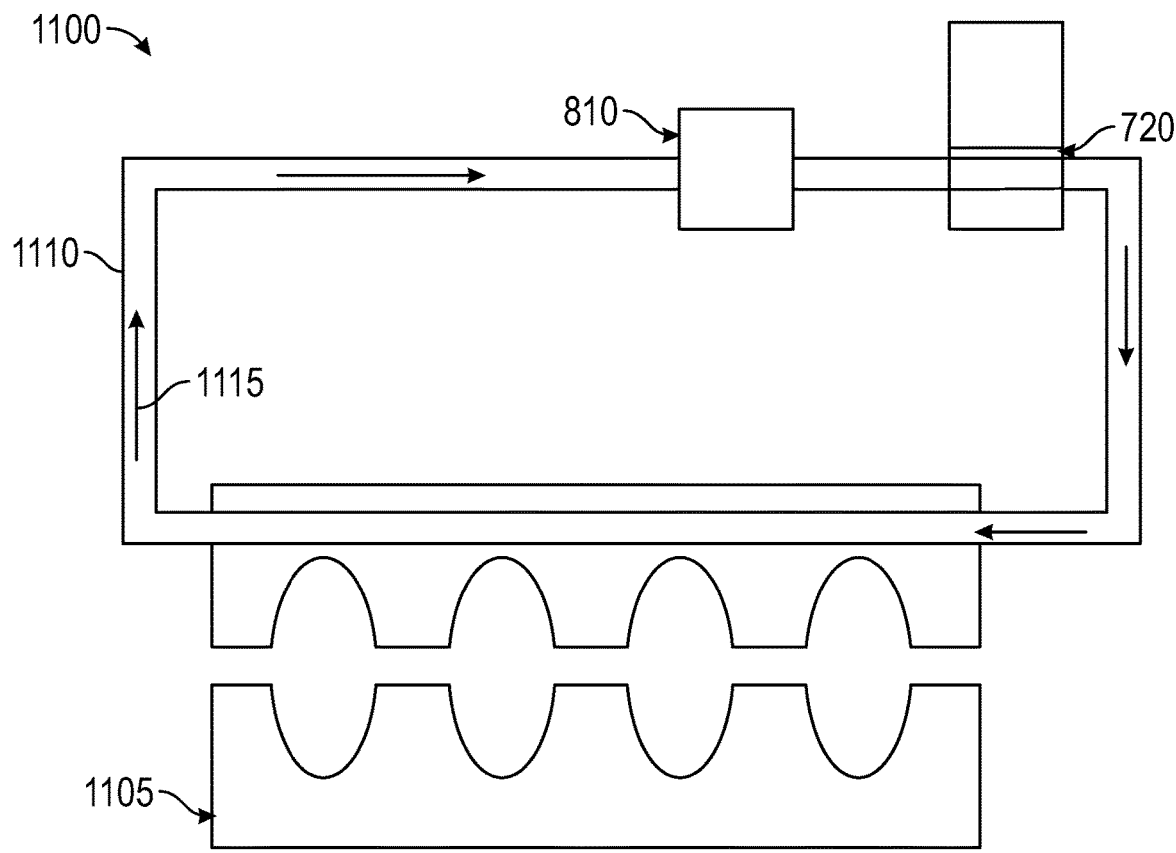
FIG. 11A depicts a system for cryogenic cooling of a conducting RF cavity, in accordance with the disclosed embodiments.

In FIG. 11A a single block RF cavity 1105 is illustrated. The cavity 1105 can comprise a normal conducting cavity made of copper or other such conductor. A line 1110 for circulating cooling fluid (shown by arrows 1115) can run through the cavity block 1105. The cooling fluid can comprise helium gas, or neon gas. Typical operating temperature can range from 20K-50 K; much warmer than a typical SRF cavity temperature.

A circulator 810 can be used to circulate the cooling fluid 1115 by the cold tip 720. The passing fluid 1115 is cooled before it passes through the cavity block 1105 where heat energy is conducted into the cooled fluid 1115. The heat collected in the fluid is then recirculated to the cold tip 720 by the circulator 810 to convect heat away from the cavity block 1105.

Figure 11B:
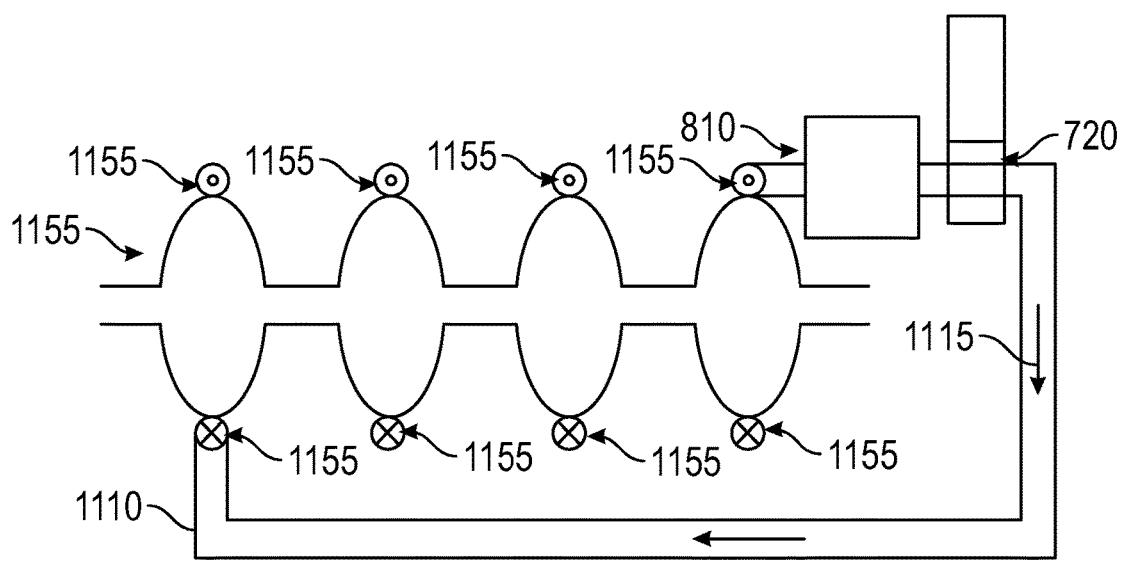
FIG. 11B depicts a system for cryogenic cooling of a conducting RF cavity, in accordance with the disclosed embodiments.

FIG. 11B illustrates an alternative embodiment. In this embodiment, the cavity cells 1160 can be made individually and then brazed or welded together. A series of interconnected cooling tubes 1155 can then be brazed or welded onto each of the cells 1160. A circulator 810 can be used to circulate the cooling fluid 1115 by the cold tip 720. The passing fluid 1115 is cooled before it passes through the cooling tubes 1155 where heat energy is conducted into the cooled fluid 1115. The heat collected in the fluid 1115 is then recirculated to the cold tip 720 by the circulator 810 to convect heat away from the cavity cells 1160.

Based on the foregoing, it can be appreciated that a number of embodiments, preferred and alternative, are disclosed herein. For example, in an embodiment, a method for assembling a conduction cooling system comprises mounting at least one cooling ring to a cavity, configuring a conduction link to be joined to the cooling ring with at least one connection assembly, and selecting the materials in the at least one connection assembly to experience greater thermal contraction than the cooling ring and the conduction link when cooled. The method can comprise selecting the cooling ring to be made of niobium, selecting the conduction link to be made of copper, and selecting the connection assembly to be made of at least one of: brass, bronze, and/or Be—Cu (beryllium copper).

In an embodiment, the method further comprises connecting at least one cooling ring to a flexible strap and making thermal contact between a bus bar and the flexible strap. The method can further comprise pumping cooled fluid through the bus bar.

In an embodiment, a conduction cooling system comprises at least one cooling ring connected to a flexible strap, a bus bar in thermal contact with the flexible strap, and a fluidic system configured to pump cooled fluid through the bus bar. In an embodiment, the fluidic system further comprises a conduit for transporting gas, a cryogenic circulator for driving the gas through the conduit, and a heat exchanger for cooling the gas flowing through the heat exchanger. In an embodiment, the system comprises at least one ring mount with at least one hole pattern that match a hole pattern on the at least one cooling ring.

In an embodiment the system further comprises a cold head connected to the bus bar. The conduction cooling system further comprises a cryocooler stage and a conduction mounting bracket connecting the cold head and the bus bar.

In an embodiment, a fast conduction cooling system comprises a cryocooler in thermal communication with a conduction cooling apparatus affixed to a cavity via a conduction path and a thermal switch in the conduction path between the cryocooler and the conduction cooling apparatus wherein a thermal conductance of the thermal switch decreases as a function of temperature.

In an embodiment, the thermal switch comprises a gas filled body with at least one fin formed therein. In an embodiment, the thermal switch comprises a gas filled body with at least one thermal absorption bed therein. In an embodiment the thermal switch comprises a gas filled body, a vacuum pump, and at least one valve wherein the valve can be opened to pump the gas out of the body. In an embodiment, the thermal switch comprises a thermal contact plate configured to mechanically engage and disengage the conduction path.

In an embodiment, of the fast conduction cooling system the conduction path is made of copper.

In an embodiment of the fast conduction cooling system the cryocooler comprises a first stage and a second stage. In an embodiment, the thermal switch is configured between the first stage and the second stage of the cryocooler. In an embodiment, the first stage is configured to provide cooling power at temperatures greater than 30 K, and the second stage is configured to provide cooling power at temperatures greater than 3K.

It will be appreciated that variations of the above-disclosed and other features and functions, or alternatives thereof, may be desirably combined into many other different systems or applications. Also, it will be appreciated that various presently unforeseen or unanticipated alternatives, modifications, variations or improvements therein may be subsequently made by those skilled in the art which are also intended to be encompassed by the following claims.

What is claimed is:

1. A method for assembling a conduction cooling system comprises:
   mounting at least one cooling ring to a cavity;
   configuring a conduction link comprising a ring mount configured to engage the cooling ring, a conduction bus, and ear-straps configured to connect the cooling ring to the conduction bus to be joined to the at least one cooling ring with at least one connection assembly comprising a bolt, and a nut; and
   selecting materials of the at least one connection assembly to be different from the material of the at least one cooling ring, and the material of the conduction link, wherein the at least one connection assembly experiences greater thermal contraction than the at least one cooling ring and the conduction link when cooled.

2. The method of claim 1 further comprising:
   selecting the at least one cooling ring to be made of niobium.

3. The method of claim 1 further comprising:
   selecting the conduction link to be made of copper.

4. The method of claim 1 further comprising:
   selecting the connection assembly to be made of at least one of:
   brass;
   bronze; and/or
   Be—Cu (beryllium copper).

5. The method of claim 1 further comprising:
   connecting the ear-straps to a conduction ring link; and
   making thermal contact between the ring link and a conduction mounting bracket.

6. The method of claim 5 further comprising:
   pumping cooled fluid through the bus bar.

7. A conduction cooling system comprising:
   at least one cooling ring connected to a flexible strap;
   a bus bar in thermal contact with the flexible strap; and
   a fluidic system configured to pump cooled fluid through the bus bar.

8. The conduction cooling system of claim 7 wherein the fluidic system further comprises:
   a conduit for transporting gas;
   a cryogenic circulator for driving the gas through the conduit; and
   a heat exchanger for cooling the gas flowing through the heat exchanger.

9. The conduction cooling system of claim 7 further comprising:
   at least one ring mount with at least one hole pattern that matches a hole pattern on the at least one cooling ring.

10. The conduction cooling system of claim 7 further comprising:
    a cold head connected to the bus bar.

11. The conduction cooling system of claim 10 further comprising:
    a cryocooler stage and a conduction mounting bracket connecting the cold head and the bus bar.

12. A fast conduction cooling system comprising:
- a cryocooler in thermal communication with a conduction cooling apparatus affixed to a cavity via a conduction path; and
- a thermal switch in the conduction path between the cryocooler and the conduction cooling apparatus wherein a thermal conductance of the thermal switch decreases as a function of temperature.

13. The fast conduction cooling system of claim 12 wherein the thermal switch comprises:
- a gas filled body with at least one fin formed therein.

14. The fast conduction cooling system of claim 12 wherein the thermal switch comprises:
- a gas filled body with at least one thermal absorption bed therein.

15. The fast conduction cooling system of claim 12 wherein the thermal switch comprises:
- a gas filled body;
- a vacuum pump; and
- at least one valve wherein the valve can be opened to pump the gas out of the body.

16. The fast conduction cooling system of claim 12 wherein the thermal switch comprises:
- a thermal contact plate configured to mechanically engage and disengage the conduction path.

17. The fast conduction cooling system of claim 12 further comprising:
- selecting the conduction path to be made of copper.

18. The fast conduction cooling system of claim 12 wherein the cryocooler comprises a first stage and a second stage.

19. The fast conduction cooling system of claim 18 wherein the thermal switch is configured between the first stage and the second stage of the cryocooler.

20. The fast conduction cooling system of claim 19 wherein the first stage is configured to provide cooling power at temperatures greater than 30 K, and wherein the second stage is configured to provide cooling power at temperatures greater than 3K.

\* \* \* \* \*